United States Patent
Thuries et al.

(10) Patent No.: US 8,328,099 B2
(45) Date of Patent: Dec. 11, 2012

(54) AUTO-FOCUSING METHOD FOR AN AUTOMATIC DATA COLLECTION DEVICE, SUCH AS AN IMAGE ACQUISITION DEVICE

(75) Inventors: Serge Thuries, Saint Jean (FR); Laurent Lognon, Saint Orens de Gameville (FR); Vincent Bessettes, Toulouse (FR)

(73) Assignee: Intermac IP Corp., Everett, WA (US)

( * ) Notice: Subject to any disclaimer, the term of this patent is extended or adjusted under 35 U.S.C. 154(b) by 744 days.

(21) Appl. No.: 12/391,078

(22) Filed: Feb. 23, 2009

(65) Prior Publication Data

US 2009/0206158 A1 Aug. 20, 2009

Related U.S. Application Data

(63) Continuation of application No. PCT/US2007/018749, filed on Aug. 23, 2007.

(60) Provisional application No. 60/824,176, filed on Aug. 31, 2006.

(51) Int. Cl.
*G03B 3/10* (2006.01)
(52) U.S. Cl. .......... 235/462.23; 235/462.01; 235/462.09
(58) Field of Classification Search ............ 235/462.23, 235/462.24, 462.01, 462.09
See application file for complete search history.

(56) References Cited

U.S. PATENT DOCUMENTS

| | | | |
|---|---|---|---|
| 4,988,852 A | 1/1991 | Krishnan | 235/462 |
| 5,378,883 A | 1/1995 | Batterman et al. | 235/472 |
| 5,598,007 A * | 1/1997 | Bunce et al. | 250/566 |
| 6,286,763 B1 | 9/2001 | Reynolds et al. | 235/472.01 |
| 6,330,974 B1 | 12/2001 | Ackley | 235/472.01 |
| 6,340,114 B1 * | 1/2002 | Correa et al. | 235/462.22 |
| 6,431,452 B2 | 8/2002 | Feng | 235/472.01 |
| 6,484,944 B1 | 11/2002 | Manine et al. | 235/462.38 |
| 6,732,930 B2 | 5/2004 | Puech et al. | 235/462.1 |
| 7,201,321 B2 * | 4/2007 | He et al. | 235/462.2 |
| 7,296,749 B2 | 11/2007 | Massieu | 235/462.23 |
| 7,407,105 B2 | 8/2008 | Massieu | 235/462.24 |
| 7,417,809 B2 | 8/2008 | Cabrera et al. | 359/819 |
| 7,474,482 B2 | 1/2009 | Manine | 359/828 |
| 7,490,776 B2 | 2/2009 | Thuries | 235/472.01 |
| 7,726,575 B2 * | 6/2010 | Wang et al. | 235/462.42 |
| 7,773,322 B2 | 8/2010 | Perreault | 359/824 |

(Continued)

OTHER PUBLICATIONS

Palmer, Roger C., *The Bar Code Book*, 3d ed., Helmers Publishing, Inc., Peterborough, N.H., 1995, pp. 79-94, 104-114, 123-129.

(Continued)

*Primary Examiner* — Ahshik Kim
(74) *Attorney, Agent, or Firm* — Seed IP Law Group PLLC

(57) ABSTRACT

An automatic data collection device includes an automatic focusing feature. The automatic focusing feature is based on a type of triangulation technique, which determines an optimum position of an imaging lens in order to obtain an optimally focused image. The position of the imaging lens may be adjusted until the imaging lens is at the optimum position. A pair of aiming beams is separated by a distance. The optimum position of the imaging lens (and/or the amount of displacement of the imaging lens that is needed to reach the optimum position) can be determined based on a relation that involves the distance between the two aiming beams, a focal length of the imaging lens, and a distance between "spots" that are respectively generated on an image plane (such as on an image sensor) by the pair of aiming beams.

28 Claims, 4 Drawing Sheets

U.S. PATENT DOCUMENTS

| | | | |
|---|---|---|---|
| 2001/0003346 A1* | 6/2001 | Feng | 235/472.01 |
| 2005/0258252 A1* | 11/2005 | Winter et al. | 235/472.02 |
| 2005/0274806 A1 | 12/2005 | Dant | 235/462.21 |
| 2006/0118635 A1* | 6/2006 | Joseph et al. | 235/462.24 |
| 2007/0051812 A1 | 3/2007 | Lopez et al. | 235/454 |
| 2007/0084926 A1 | 4/2007 | Lopez et al. | 235/454 |
| 2007/0164112 A1 | 7/2007 | Dant | 235/454 |
| 2007/0295817 A1 | 12/2007 | Massieu | 235/462.23 |
| 2010/0147957 A1* | 6/2010 | Gurevich | 235/472.03 |

OTHER PUBLICATIONS

International Search Report, mailed Jul. 28, 2008, for PCT/US07/18749, 2 pages.

Written Opinion, mailed Jul. 28, 2008, for PCT/US07/18749, 5 pages.

* cited by examiner

AUTO-FOCUSING METHOD FOR AN AUTOMATIC DATA COLLECTION DEVICE, SUCH AS AN IMAGE ACQUISITION DEVICE

CROSS REFERENCE TO RELATED APPLICATION

This is a continuation application of PCT/US2007/018749 filed on Aug. 23, 2007 which claims the benefit of and priority under 35 U.S.C. §119(e) to U.S. Provisional Patent Application Ser. No. 60/824,176, filed Aug. 31, 2006, the contents of which are incorporated herein by reference in their entirety.

TECHNICAL FIELD

The present disclosure relates generally to electronic devices for reading data carriers, such as machine-readable symbols (e.g., matrix codes, barcodes, stacked codes, and the like), and more particularly but not exclusively, relates to auto-focusing techniques for a data collection device, such as an image acquisition device.

BACKGROUND INFORMATION

The automatic data collection (ADC) arts include numerous systems for representing information in machine-readable form. For example, a variety of symbologies exist for representing information in barcode symbols, matrix or area code symbols, and/or stacked symbols. A symbology typically refers to a set of machine-readable symbol characters, some of which are mapped to a set of human-recognizable symbols such as alphabetic characters and/or numeric values. Machine-readable symbols are typically composed of machine-readable symbol characters selected from the particular symbology to encode information. Machine-readable symbols typically encode information about an object on which the machine-readable symbol is printed, etched, carried or attached to, for example, via packaging or a tag.

Barcode symbols are a common one-dimensional (1D) form of machine-readable symbols. Barcode symbols typically comprise a pattern of vertical bars of various widths separated by spaces of various widths, with information encoded in the relative thickness of the bars and/or spaces, each of which have different light reflecting properties. One-dimensional barcode symbols require a relatively large space to convey a small amount of data.

Two-dimensional symbologies have been developed to increase the data density of machine-readable symbols. Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual barcode symbols.

Some other examples of two-dimensional symbologies include matrix or area code symbologies (hereinafter matrix code). A matrix code machine-readable symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional barcode symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light reflected from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed. Demodulation typically includes an analog-to-digital conversion and a decoding of the resulting digital signal.

Scanning type machine-readable symbol readers typically employ a source of coherent light such as a laser diode to produce a beam, and employ a beam deflection system such as a rotating or oscillating mirror to scan the resulting beam across the machine-readable symbols.

In imaging, the machine-readable symbol reader may flood the machine-readable symbol with light, or may rely on ambient lighting. A one-dimensional (linear) or two-dimensional image (2D) capture device or imager such as a charge coupled device (CCD) or APS array captures a digital image of the illuminated machine-readable symbol, typically by electronically sampling or scanning the pixels of the linear or two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

Regardless of the type of data carrier used, their usefulness is limited by the capability of a data collection device (such as a matrix code reader, barcode reader, and the like) to accurately capture the data encoded in the machine-readable symbol. Optical data collection devices are directional in nature—such devices need to be optimally positioned in order to accurately read the data on the target symbol. For example, if the data collection device is positioned too far from a target machine-readable symbol, then the target machine-readable symbol may be out of range or otherwise outside of an optimal focus distance of the data collection device. As a result, the data encoded in the target machine-readable system may not be read or may be read incorrectly. The inability of an inexperienced user to skillfully position the data collection device also contributes to the directional limitations of such devices, thereby further contributing to the chances of erroneous or missed data readings.

BRIEF SUMMARY

One aspect provides an automatic data collection system that includes: means for generating at least one aiming beam that can be directed at a target machine-readable symbol; image detector means for capturing at least one image of the target machine-readable symbol having the aiming beam directed thereon, the at least one image having a first point corresponding to the aiming beam and having a second point; means for determining a first distance between the first and second points; and means responsive to the determined first distance for changing a second distance between the image detector means and an imaging lens to change a focus of the data collection device.

Another aspect provides a method usable with an imager type automatic data collection device. The method includes directing at least one aiming beam at a target machine-readable symbol. At an image detector of the data collection device, at least one image of the target machine-readable symbol having the aiming beam directed thereon is captured. The at least one image has a first point corresponding to the aiming beam and has a second point. A first distance between the first and second points is determined, and the determined first distance is used to change a second distance between the image detector and an imaging lens to change a focus of the data collection device.

Still another aspect provides an automatic data collection apparatus that includes: at least one light source to generate a human-perceptible light that produces a human-perceptible indication on a target machine-readable symbol to be imaged; a lens; a sensor to detect a portion of the human-perceptible light that is returned from the target machine-readable symbol through the lens, the detected light being represented by the sensor in an image plane as a first point that corresponds to the human-perceptible indication on the target machine-readable symbol, the sensor further to provide a second point in the image plane; a processor coupled to the sensor to determine a first distance between the first and second points; and an adjustment element responsive to the processor to change a second distance between the sensor and the lens based on the determined first distance, a change in the second distance corresponding to an automatic focusing operation.

Yet another aspect provides an article of manufacture that includes a machine-readable medium usable with an automatic data collection device and having instructions stored thereon that are executable by a processor to automatically focus the data collection device, by: generating at least one aiming beam that can be directed at a target machine-readable symbol; determining a first distance between first and second points in an image of the target machine-readable symbol having the aiming beam directed thereon, the first point corresponding to a human-perceptible indication on the target machine-readable symbol that is generated by the aiming beam; and using the determined first distance to change a second distance between an image plane corresponding to the image and an imaging lens.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of automatic focusing techniques for an automatic data collection device are described herein. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As an overview, an embodiment of an automatic data collection device is provided with an automatic focusing feature. The automatic focusing feature of one embodiment is based on a type of triangulation technique, which determines an optimum position of an imaging lens in order to obtain an optimally focused image. The position of the imaging lens may be incrementally changed or otherwise adjusted until the imaging lens is at the optimum position.

In one embodiment, a pair of aiming beams separated by a distance is provided. The optimum position of the imaging lens (and/or the amount of displacement of the imaging lens that is needed to reach the optimum position) can be determined based on a relation that involves the distance between the two aiming beams, a focal length of the imaging lens, and a distance between "spots" that are generated on an image plane (such as on an image sensor). The position of the imaging lens (to the optimum position for optimum image focus) can be adjusted using a motor or using some other type of adjustment element.

In an embodiment, the various operations associated with focusing, such as determination of the optimum position of the imaging lens (and/or the amount of displacement that is needed to reach the optimum position), the adjustment of the position of the imaging lens, the associated capturing and analysis of images of target machine-readable symbols, etc., are performed automatically with minimal or no user action required. Thus, an automatic focusing capability is provided that is substantially transparent, as well as convenient, to a user of the data collection device.

Figure 1:
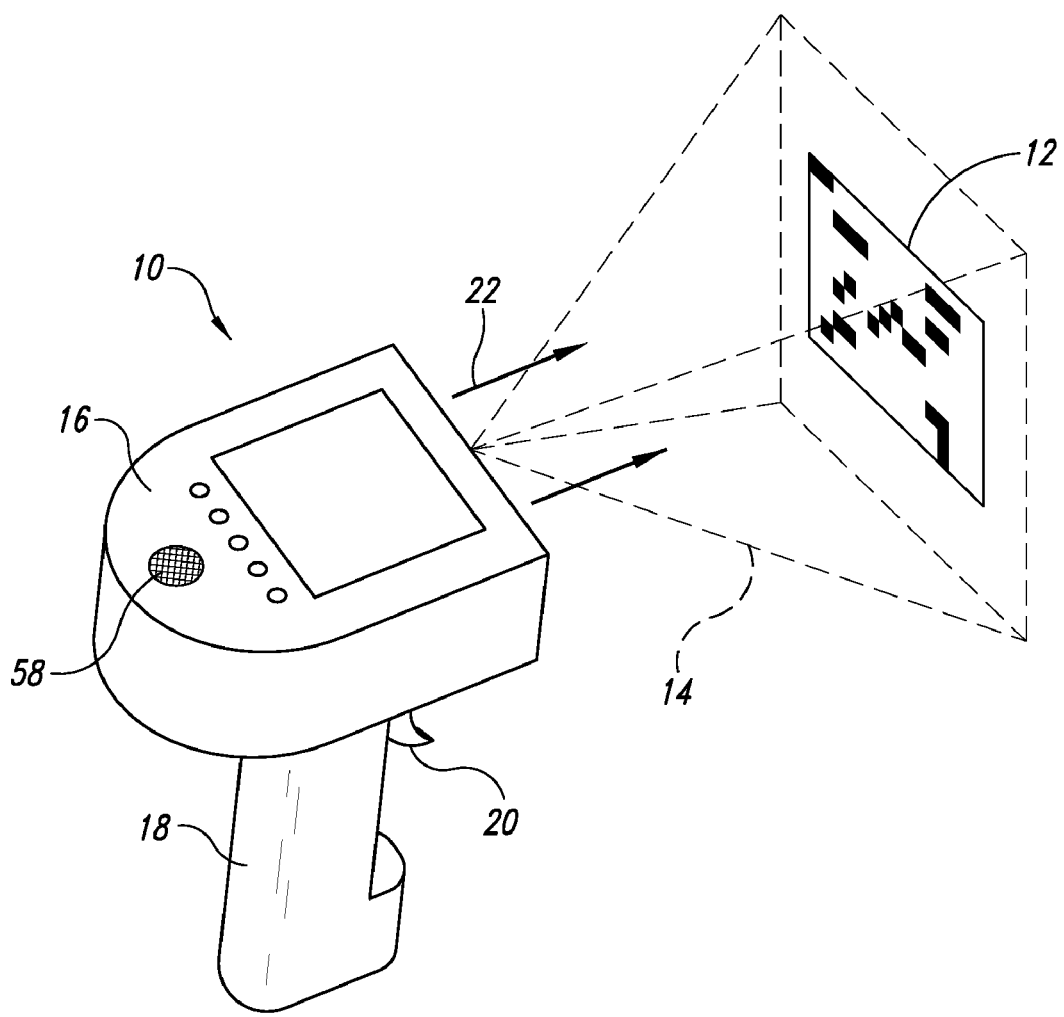
FIG. 1 is an upper isometric view of an embodiment of an automatic data collection device reading a target machine-readable symbol.

FIG. 1 shows an automatic data collection device 10 for reading one or more target machine-readable symbols, such a matrix code symbol 12 or some other two-dimensional (2D) or one-dimensional (1D) symbol. While the matrix code symbol 12 is illustrated, the target machine-readable symbol may be embodied as any other type of 1D or 2D symbol that can be read using imaging techniques. Examples of such other target machine-readable symbols include, but are not limited to, a stacked code symbol, a barcode symbol, or other types of 1D or 2D machine-readable symbols, for instance. For the sake of simplicity of explanation hereinafter and unless the context is otherwise, the various embodiments pertaining to the data collection device 10 shown in FIG. 1 and elsewhere will be described with respect to the target machine-readable symbol being in the form of the matrix code symbol 12.

The data collection device 10 includes a head 16, a handle 18, and an actuator such as a trigger 20. While the trigger 20 is shown with a specific shape and in a specific location in the embodiment of FIG. 1, other embodiments may employ different arrangements. For example, the trigger 20 can be embodied as a side-mounted finger trigger, top-mounted thumb trigger, button or key, touch screen, and other trigger arrangements. One embodiment further provides a proximity trigger, which uses optics, acoustics, or other mechanism to determine proximity of an object to automatically activate without requiring a user to pull the trigger. In one embodiment, the trigger 20 can be implemented as a multi-position trigger that can be pulled/pressed in stages. For example, an initial press (e.g., pressing the trigger 20 halfway) can be used to perform initial illumination and image acquisition for automatic focusing purposes, and a further press (e.g., further pressing the trigger 20 to its fully pressed position) can be used to perform final image acquisition. In yet other embodiments, image acquisition (whether initial image acquisition during the automatic focusing process and/or final image acquisition) can be automatically initiated after expiration of a set time period after the data collection device has been pointed at the matrix code symbol 12, or automatically initiated after sensing a lack of movement of the data collection device 10, generally indicating that the data collection device 10 is being pointed at a desired target symbol.

The data collection device 10 can comprise a portable data collection device, a hand-held imager type device, or other suitable electronic device having the various data reading capabilities described herein. Some embodiments are provided that may not necessarily have the same shape or identical features or identical use as the embodiments illustrated in the various figures. However, such embodiments can nevertheless include embodiments of the automatic focusing features described herein.

The embodiment of the data collection device 10 of FIG. 1 generates an illumination beam 14, which is symbolically depicted in broken lines as one or more beams of light directed at the matrix code symbol 12 and having a generally rectangular illumination pattern. Such illumination pattern produced by the illumination beam 14 can comprise various other shapes such as substantially square, elliptical, circular, and so forth. In an embodiment, illumination of the target matrix code symbol 12 may be provided partly or entirely by ambient light.

In one embodiment, the data collection device 10 generates at least one aiming beam 22, which is directed towards the target matrix code symbol 12. The aiming beam 22 allows the user to visually locate a target machine-readable symbol or to otherwise visually verify the positioning of the data collection device 10 relative to the target symbol, such as the matrix code symbol 12. As will be explained in more detail below, one or more aiming beams 22 can be used in conjunction with an automatic focusing technique for the data collection device 10. Specifically, a fixed distance between a pair of parallel aiming beams 22 is one of the parameters usable for calculation of an optimum lens position for focused image acquisition.

In one embodiment, the one or more (e.g., a pair of) aiming beams 22 can be generated using one or more light sources that are suitably arranged to generate a desired size and shape of an aiming pattern on the matrix code symbol 12. Examples of such light sources include laser light sources, light emitting diodes (LEDs), or other types of light sources that generate light that is visible to the user and that can be detected by a sensor. In one embodiment, a pair of light sources generates a corresponding pair of substantially parallel aiming beams 22. Therefore, the aiming pattern comprises a pair of parallel "spots" or other human-perceptible indication that are projected onto the matrix code symbol 12.

Other shapes or configurations of the aiming pattern can be provided. For example, an aiming pattern can be generated by two diverging aiming beams 22, rather than by parallel beams. As another example, the aiming pattern directed onto the matrix code symbol 12 can comprise crossing lines, parallel lines, a polygon, elliptical, or other arrangement of light on the matrix code symbol 12 that is suitable to indicate to the user that the data collection device 10 is being properly aimed.

To generate a horizontally oriented linear aiming pattern, for example, a plurality of LEDs can be arranged in a row at the data collection device 10, such that the LEDs generate parallel coherent light beams that provide a stationary, single, and continuous horizontal bar of light that is incident on the matrix code symbol 12. Further in another embodiment, the shape, size, and/or intensity of the aiming pattern can be adapted based on certain conditions, such as the size or shape of the target machine-readable symbol and/or based on some other factor.

Figure 2:
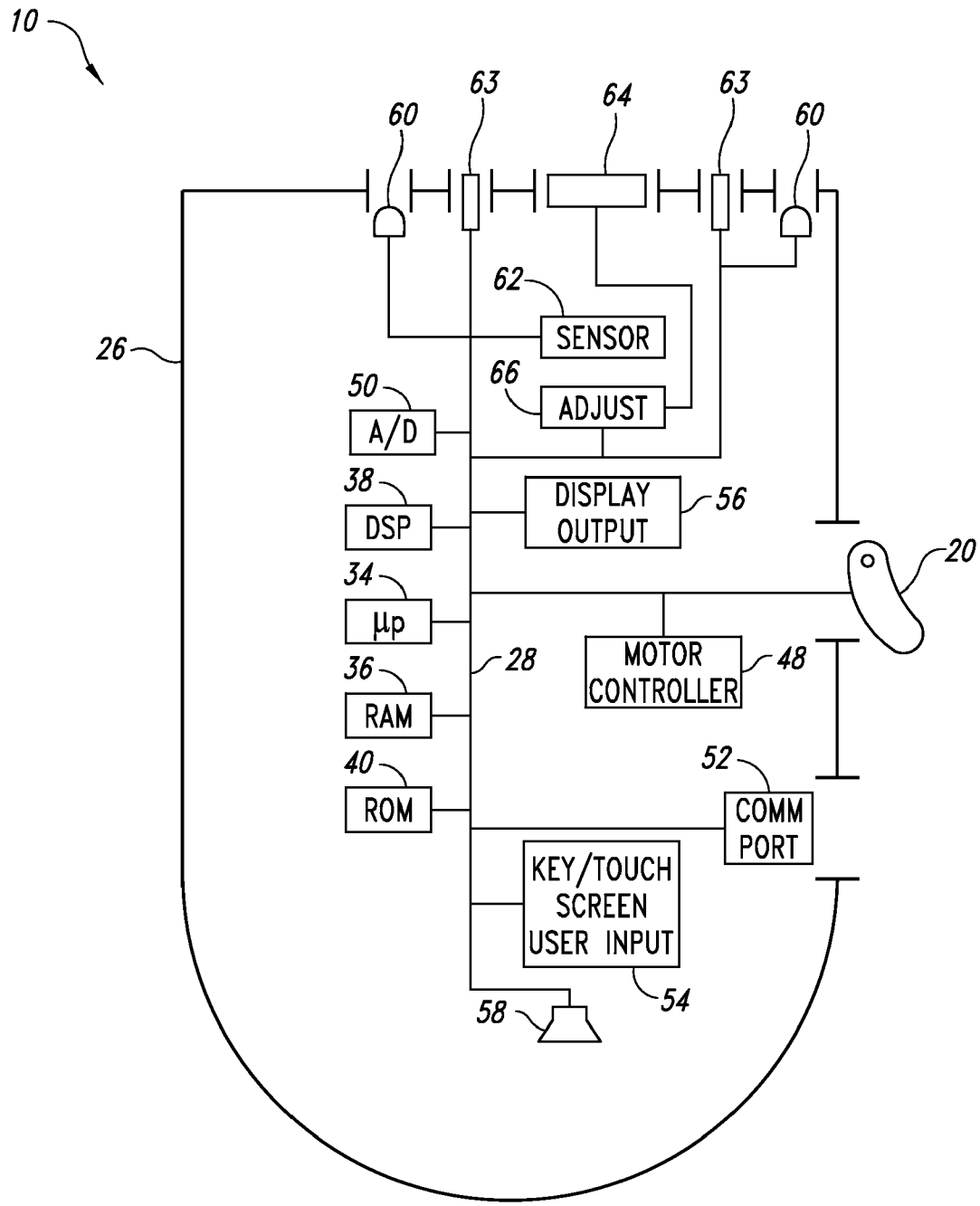
FIG. 2 is a functional block diagram of one embodiment of the data collection device of FIG. 1.

FIG. 2 is a block diagram of one embodiment of the data collection device 10 that can implement the features described herein, and particularly a data collection device 10 having an automatic focusing feature. While such a block diagram depicts a dedicated 2D and/or 1D data collection device that uses imaging, such embodiment(s) are illustrated and described in this manner for convenience. The features depicted in the illustrated embodiment can be suitably supplemented with other components, so as to provide a multi-mode data collection device that is operable to read any one or more of 1D, 2D, or other type of machine-readable symbols using imaging or scanning, and which may additionally read other types of automatic data collection (ADC) data carriers, including RFID and/or acoustical data carriers, for example.

As shown in the embodiment of FIG. 2, the data collection device 10 has a housing 26 that carries various components, symbolically shown as being coupled together via a bus 28. The bus 28 provides data, commands, and/or power to the various components of the data collection device 10. The data collection device 10 can include an internal power source such as a rechargeable battery (not shown), or can receive power from an external power source such as a wall outlet by way of an electrical cord (not shown).

The data collection device 10 may include one or more flood illumination sources 60, such as a plurality of light sources, to substantially illuminate a target symbol such as the matrix code symbol 12. The flood illumination source 60 can be in the form of one or more LED light sources, or other suitable type of light source(s) that can be used for target illumination in the manner previously described above.

In an embodiment, the data collection device 10 includes one or more aiming light sources 63 to generate the aiming beam(s) 22. The light source 63 can be in the form of one or more laser light sources, LED light sources, or other suitable type of light source(s) that can be used to generate visually perceptible aiming beam(s) 22. In one embodiment, a pair of light sources 63 is provided that are separated from each other by a known distance. As will be explained in further detail below, this separation distance can be one of the parameters that are usable in conjunction with providing an automatic focusing feature.

A motor controller 48 can be provided for a variety of purposes. The motor controller 48 can control movement of the illumination source(s) 60 and/or the aiming light source (s) 63, and/or can control movement of a reflective mirror (or other mechanical or optical element) that focuses the illumination onto the target region, for example. The motor controller 48 can also be used to control a mirror, prism, lens and/or other mechanical or other optical element to focus or otherwise direct the returned image (from the target matrix code symbol 12) onto an imager or image detector 62 (or other image array or image sensor).

In one embodiment, the optical element that directs the image onto the image detector 62 comprises a lens 64. The lens 64 is separated from the image detector 62 by a certain distance, which as will be explained below, is one of the parameters that can be used in conjunction with an embodiment of the automatic focusing feature. The distance between the lens 64 and the image detector 62 is adjustable in one embodiment. For example, the position of the lens 64 can be adjusted by an adjustment element 66, while the image detector 62 is kept stationary, such that the distance is shortened or lengthened. In one embodiment, the adjustment element 66 can comprise a motor (such as a stepper motor) and associated electronics and components coupled to the lens 64. The adjustment element 66 and the motor controller 48 can comprise the same component in one embodiment.

In an embodiment, various mechanical linkages, bearings, tubular members, screws, or other type of mechanical elements can be used alternatively or additionally to (and/or as part of) the adjustment element 66 and/or the motor controller 48 to change the position of the lens 64 relative to the image detector 62. Examples of mechanical and other structural components of an optical assembly that allow smooth and accurate adjustment of an optical element along an optical axis or other desired direction are disclosed in U.S. patent application Ser. No. 11/406,831, entitled "METHOD, APPARATUS, AND ARTICLE FOR ADJUSTING OPTICAL DEVICE," filed Apr. 19, 2006, assigned to the same assignee as the present application, and incorporated herein by reference in its entirety.

Alternatively or additionally, the distance between the lens 64 and the image detector 62 can be adjusted by changing a position of the image detector 62, while the lens 64 is kept stationary. For instance, the image detector 62 can be moved further away from or closer to the lens 64. It is also possible to provide an embodiment where both the lens 64 and the image detector 62 are movable, such that their positions can be changed to adjust the distance between them. The adjustment element 66, the motor controller 48, and/or some other component can be used to change the position of the image detector 62 relative to the lens 64.

In yet another embodiment, the lens 64 can comprise a deformable optical element, such as a lens or mirror with an adjustable focal length. Examples of a deformable optical element are disclosed in U.S. patent application Ser. No. 11/765,827, entitled "AUTOMATIC DATA COLLECTION APPARATUS AND METHOD FOR VARIABLE FOCUS USING A DEFORMABLE MIRROR," filed Jun. 20, 2007, which claims priority to U.S. Provisional Patent Application Ser. No. 60/805,556, entitled "AUTOMATIC DATA COLLECTION APPARATUS AND METHOD FOR VARIABLE FOCUS USING A DEFORMABLE MIRROR," filed Jun. 22, 2006, both of which are assigned to the same assignee as the present application, and incorporated herein by reference in their entireties.

The image detector 62 is positioned to receive illumination returned from the target symbol during image acquisition of the matrix code symbol 12. The image detector 62 can take the form of a one- or two-dimensional charge coupled device (CCD) array, for example, or other suitable image sensor or image array. The image detector 62 of various embodiments can implement linear imagers, 2D imagers, or other types of imagers usable with a variety of light sources. In certain embodiments, the data collection device 10 can omit or reduce the output of the illumination source 60 for purposes of image acquisition, for example where the image detector 62 is a two-dimensional CCD array operable with ambient light.

In one embodiment, the image detector 62 includes or corresponds to a plurality of pixels of an image. The pixels can have a dimension, such pixel lengths, widths, or other dimensional characteristic. An embodiment that uses the pixel length of an image incident on the image detector 62 for automatic focusing will be described later below.

The data collection device 10 of FIG. 2 includes at least one microprocessor, controller, microcontroller, or other processor, which are symbolically shown as a single microprocessor 34. The data collection device 10 may include separate dedicated processors for reading and processing matrix code symbols, RFID tags, acoustical tags, barcode symbols, other data carriers, and the like, as well as one or more processors for controlling operation of the data collection device 10.

Moreover, in one example embodiment at least one digital signal processor (DSP) 38 may be provided to cooperate with the microprocessor 34 to process signals and data returned from the symbols. Such signal processing may be performed for purposes of reading data from signals received from the target symbol. For instance during decoding, the DSP 38 can perform image processing to extract the underlying data from the captured image of the matrix code symbol 12 or the barcode symbol 22.

Alternatively or additionally, the microprocessor 34 can execute software (such as embodied by a computer program) or other machine-readable or computer-readable instructions stored in a machine-readable or computer-readable storage medium in order to perform the decoding or to otherwise control operation of the data collection device 10, including the embodiments of the automatic focusing techniques described herein. Such storage medium can be embodied by a random access memory (RAM) 36, a read only memory (ROM) 40, or other storage medium. The software stored in the storage medium can include a decoding algorithm.

In an embodiment, the ROM 40 stores instructions for execution by the microprocessor 34 to operate the various components of the data collection device 10. For example, the ROM 40 contains instructions for the microprocessor 34 that permit the microprocessor 34 to control the image detector 62 to capture image data and to decode and/or manipulate the captured image data. As used in this herein, ROM includes any non-volatile memory, including erasable memories such as EEPROMs.

The RAM 36 is provided to temporarily store data, such as a captured image data from the image detector 62. The RAM 36 can also store other types of data, such as variable values, results of calculations, state data, or other information.

An analog-to-digital (A/D) converter 50 can be used if necessary to transform various analog electrical signals to digital form, such as communication signals or user input signals. The bus 28 couples the digital data from the A/D converter 50 to the microprocessor 34 and the RAM 36.

Symbol reading and decoding technology is well known in the art and will not be discussed in further detail. Many alternatives for image sensors, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10 can include a communication port 52 to provide communications to external devices. The communication port 52 can be a hardwire or wireless interface, and can employ an antenna, radio, USB connection, Ethernet connection, modem, or other type of communication device. The communication port 52 can provide communications over a communications network (not shown) to a host (not shown), allowing transmissions of data and/or commands between the data collection device 10 and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. Other devices for providing user input can be used. The user input device 54 is usable to allow the user to select modes (e.g., modes for reading matrix code symbols, barcode symbols, or other symbols), turn the data collection device 100N/OFF, adjust power levels, and others. The bus 28 couples the user input device 54 to the microprocessor 34 to allow the user to enter data and commands.

The bus 28 also couples the trigger 20 to the microprocessor 34. In response to activation of the trigger 20, the microprocessor 34 can cause the illumination source 60 to emit light for target locating. A subsequent or additional pressing of the trigger 20 can be used to activate image acquisition.

The data collection device 10 includes human-perceptible visual (e.g., a display output) and audio indicators (e.g., sounds) 56 and 58 respectively. The bus 28 couples the visual and audio indicators 56 and 58 to the microprocessor 34 for control thereby. The visual indicators 56 take a variety of forms, for example: light emitting diodes (LEDs) or a graphic display such as a liquid crystal display (LCD) having pixels. These or other visual indicators can also provide other data associated with the operation of the data collection device 10, such as visual indicators to indicate whether the data collection device 10 is ON/OFF, reading, interrogating, low on battery power, successful or unsuccessful reads/interrogations, and so forth.

The audio indicator 58 can take the sounds from one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a symbol was successfully or unsuccessfully read, low battery power, or other information.

One or more embodiments of the automatic focusing technique will now be described with reference to FIG. 3. As an initial consideration, a first approximation of a distance d from the sensor (e.g., the image detector 62) to an optical center 70 of the lens 64 is provided by an affine function (e.g., a function in the form of d=A·e+B) of a distance e between two spots 72 and 74 measured in an image plane. The image plane is present or otherwise formed on the image detector 62, such as an image formed or represented by pixels in an array. The two spots 72 and 74 (such as laser spots) are the images of two corresponding spots 76 and 78 that are placed onto the target matrix code symbol 12 by the aiming beams 22, and then captured by the image detector 62.

The distance e can be expressed in terms of a number of the pixels n. The following parameters are constants in the data collection device 10 that can be determined at the design and/or manufacturing stage:

ε=pixel size
f=focal length of the lens 64
L=distance between the two aiming beams 22

It is noted that in one embodiment, the two aiming beams 22 are assumed to be parallel. However, even with a small divergence in either or both of these aiming beams 22, it can be demonstrated that the function d(e) remains affine. In such a situation, L is no longer constant but varies linearly with D (described below).

The following parameters are variables having values that change as a user uses the data collection device 10:

D=distance from optical center 70 of the lens 64 to the object plane (e.g., to the target matrix code symbol 12)
d=distance from optical center 70 of the lens 64 to the image plane (e.g., to the image detector 62)
e=distance between the image of the laser spots 72 and 74 in the image plane
n=distance e expressed in number of pixels (e=n·E)

Assuming that the lens 64 can be represented by a thin lens, Descartes' formula provides the following equation (1) for the best focus length f for the lens 64:

$$1/d + 1/D = 1/f \quad (1)$$

Figure 3:
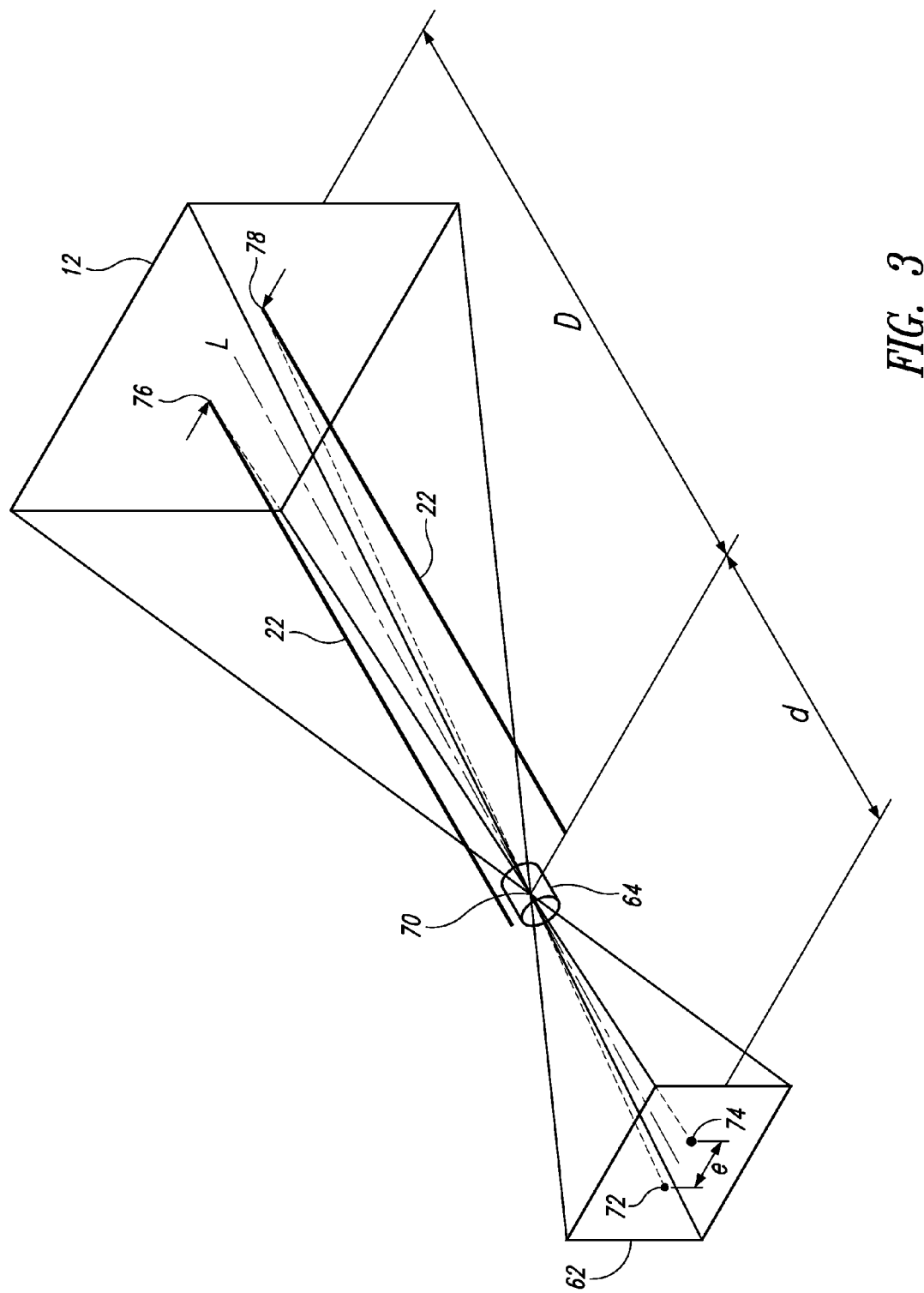
FIG. 3 is a diagram showing parameters associated with the automatic data collection devices of FIGS. 1-2 that can be used in determining an optimum focus position according to an embodiment.

Considering the similar triangles depicted in FIG. 3, the following equation (2) can be derived (e.g., proportional bases and heights of the two similar triangles):

$$e/L = d/D \quad (2)$$

The following equation (3) can thus be derived from equations (1) and (2) from above:

$$\begin{aligned} d &= (e/L + 1) \cdot f \\ &= n\varepsilon f/L + f \\ &= k \cdot n + f \end{aligned} \quad (3)$$

The equation d=k·n+f is an affine equation, with a constant k=εf/L and a constant f. That is, d=A·n+B is a linear equation, where A represents a slope and B represents an origin ordinate. In an embodiment, the values of k and f can be determined at the design or manufacturing stage, and stored in memory (such as in the ROM 40).

When D approaches infinity (∞), e approaches zero (0) and d approaches f in accordance with equation (3), and the following equation (4) is obtained:

$$\Delta d_\infty = n\varepsilon f/L = k \cdot n \text{ (a linear equation)} \quad (4)$$

Accordingly from equations (3) and (4), the number of pixels n can be used to determine the distance d between the lens 64 and the image detector 62 (and/or the amount of required adjustment/change Δd in the position of the lens 64 and the image detector 62 relative to each other) for optimum focus. The number of pixels n in the image detector 62 (between the two spots 72 and 74) can be determined using various techniques.

For example, if the two spots 72 and 74 are represented by activated pixels, then the number of inactivated pixels present between the activated pixels can be counted to obtain n. Either or both of the two active pixels corresponding to the spots 72 and 74 may (or may not) themselves be counted to obtain n, according to various embodiments. Alternatively or additionally, image processing can be performed by the processor 34 to determine the number of pixels between the images of the two spots 72 and 74. Again, according to various embodiments, either or both of the two active pixels corresponding to the spots 72 and 74 may (or may not) be counted themselves to obtain n. Once n is determined, the desired optimum focus distance d (and/or $\Delta d$) can be calculated to change the position of the lens 64 relative to the image detector 62 (and/or vice versa).

Figure 4:
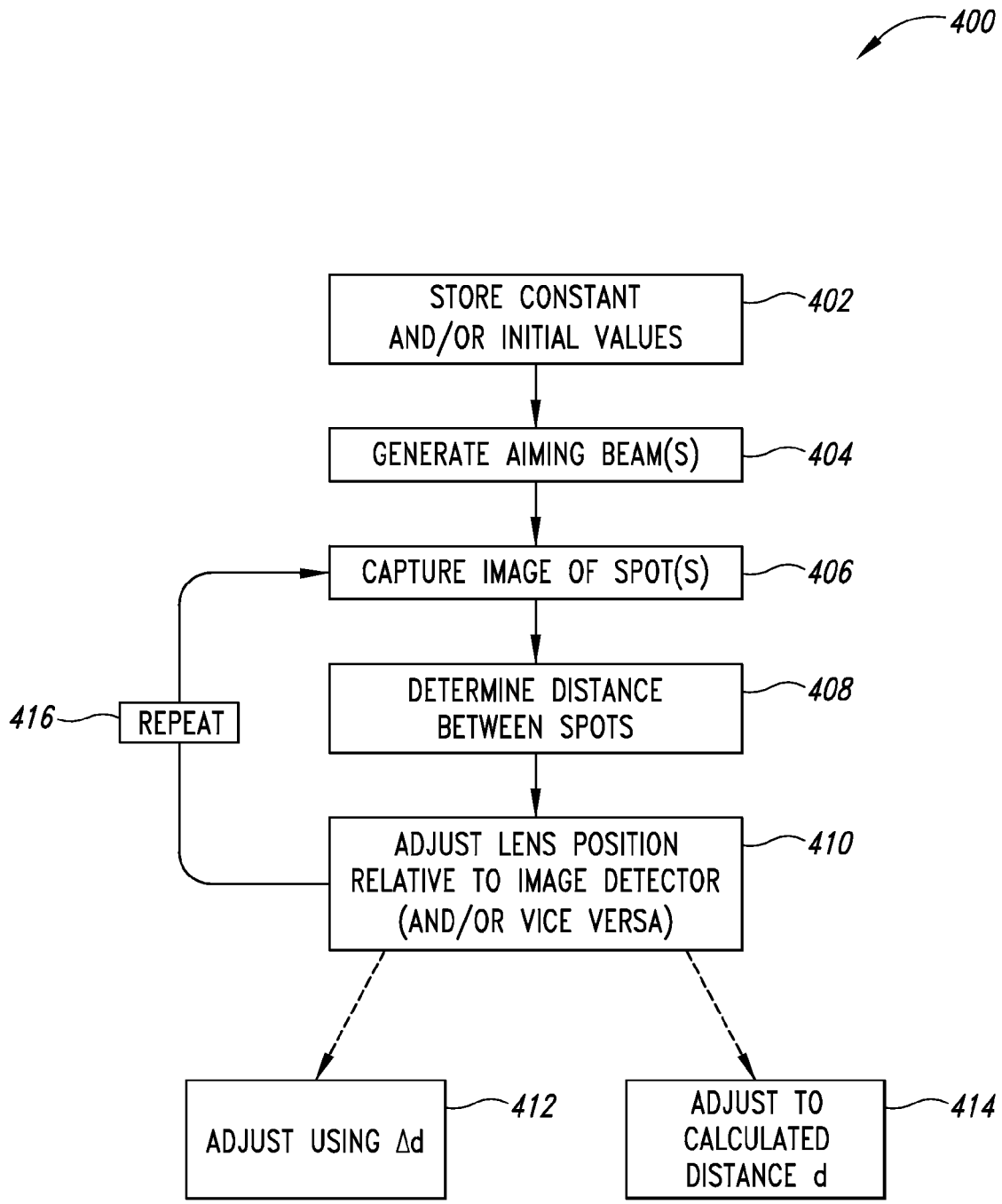
FIG. 4 is a flow diagram of an embodiment of an automatic focusing method that is based on the parameters shown in FIG. 3 and that can be used by the automatic data collection devices of FIGS. 1-2.

FIG. 4 is a flow diagram 400 of an embodiment of an automatic focusing method based on the parameters shown in FIG. 3 and explained above. In one embodiment, at least some of the operations depicted in the flow diagram 400 may be implemented in software or other machine-readable instructions (such as a computer program) stored in a machine-readable medium (such as a computer-readable medium) and executable by one or more processors. For instance, the software may be stored in the RAM 36 and/or ROM 40, and executable by the processor 34.

The various operations depicted in the flow diagram 400 need not necessarily occur in the exact order shown. Moreover, certain operations may be suitably added, removed, modified, or combined.

Beginning at a block 402, certain values are stored in memory, such as in the ROM 40 or other storage unit. Examples of constant values that may be stored at the block 402 include the values of $k=\epsilon f/L$ and the focal length f of the lens 64. The number of pixels in the image detector 62 and/or number of pixels in the image generated from the image detector 62 may also be stored at the block 402, as well as other constant values. An example of a variable value that may be stored at the block 402 is an initial value of the distance d between the lens 64 and the image detector 62.

Next at a block 404, the user begins operation of the data collection device 10, such as by partially pressing the trigger 20 to generate one or more of the aiming beams 22. The aiming beam(s) 22 is directed towards the target matrix code symbol 12, thereby forming an aiming pattern (comprising the spots 76 and 78 thereon).

The image of the spots 76 and 78 are captured at a block 406. That is, for example, the spots 76 and 78 on the matrix code symbol 12 are returned as light onto the image plane (on the image detector 62), thereby generating the corresponding spots 72 and 74 in the captured image.

At a block 408, the distance between the spots 72 and 74 in the image plane is determined. As explained above, this distance has a value of n pixels in one embodiment. Again as explained above, various techniques may be used to determine the value of n, such as by determining (such as by counting) the number of pixels between the spots 72 and 74 that have a different state than pixels corresponding to the spots 72 and 74. For instance, the pixels between the spots 72 and 74 may be deactivated, while the pixels corresponding to the spots 72 and 74 may be activated (or vice versa). In other embodiments, the different states between the pixels may be represented by different colors, different gray levels, different charge levels, or other differentiating electrical, chemical, or mechanical property. In yet other embodiments, the pixels corresponding to the spots 72 and 74 may also be included in the count of number of pixels n.

In yet other embodiments, the captured image itself may be processed to determine the value of n. For instance, image sampling, filtering, digital signal processing (by the DSP 38), or other image processing can be performed to determine the value of n at the block 408.

In some embodiments, localization of the spots within the image may be performed. A first embodiment may use a "single frame-fast algorithm" wherein the spots are localized by determining the barycenter of the aggregates of pixels having values that exceed a certain threshold. To avoid false spot detection (specular reflection for instance), the shape of the aggregate can be used to validate a spot. A second embodiment may use a "double frames-safe algorithm" wherein in order to reduce the risk of false spot detection, the aiming beams can be switched ON/OFF every other frame of the image stream. Then, the spot localization can be made much more safe and easy by comparing consecutive frames (such as with image subtraction), assuming that the frame rate is sufficiently high and/or the user is sufficiently still to neglect the motion from one frame to the next frame.

Once the value of n has been determined at the block 408, then equation (3) above can be used to determine the optimum value of the distance d that corresponds to the determined value of n. Alternatively or additionally, the determined value of n can be used in accordance with equation (4) to determine the incremental change $\Delta d$ that is needed to place the lens 64 in the optimal position. The position of the lens 64 relative to the image detector 62 is adjusted at a block 410 (and/or vice versa) based on the determined values of d (and/or $\Delta d$).

A block 412 in the flow diagram 400 represents adjustment based on the determined value $\Delta d$. In this embodiment, the processor 34 instructs the adjustment element 66 to move the lens 64 closer (or further) from the image detector 62 by the distance $\Delta d$, while the position of the image detector 62 remains stationary. In another embodiment, the adjustment element 66 adjusts the position of the image detector by the distance $\Delta d$, while the position of the lens 64 remains stationary. In yet another embodiment, both the lens 64 and the image detector 62 have positions that can be adjusted relative to each other by a cumulative amount of $\Delta d$. Still further embodiments provide the lens 64 and/or the image detector 62 with adjustable focal lengths, as explained above.

A block 414 in the flow diagram 400 represents adjustment based on the determined optimum value of d. In such an embodiment, an initial value of $d_0$ (before image acquisition) may be stored in the RAM 36. Then, the determined optimum value of d is compared with this stored initial value of $d_0$ to determine the amount of change/adjustment needed in the distance between the lens 64 and the image detector 62. In yet another embodiment, the various possible values of d may be preset in the data collection device 10, such that upon determination of the optimum value of d, the processor 34 can generate the appropriate control signals to have the lens 64 (and/or the image detector 62) adjusted to that position.

Other techniques, different than those described above, may be provided in other embodiments to change the distance d between the lens 64 and the image detector 62. A person skilled in the art having the benefit of this disclosure would understand the details as to how such embodiments can be implemented.

If necessary, the process described above can be repeated at a block 416. For example, successive images can be captured and adjustments made to further optimize the degree of focus. Once focus has been optimized, then final image acquisition can be performed, such as when the user presses the trigger 20 into its final position after receiving an indication (visual or otherwise) that the automatic focusing process has been completed. In another embodiment, the final acquired image frame in the automatic focusing process is the final image that is captured, without the need to obtain a further image frame in response to further user action.

The embodiments described above with reference to FIGS. 3-4 thus achieve a real-time (single frame) automatic focus. From the measurement of the distance between the two bright spots 72 and 74 in the image, expressed in pixels n, the lens 64 can be adjusted to the right position d to provide the best focus.

The embodiments described above use the affine equation that is derived from Descartes' formula, which assumes that the lens 64 has some degree of focus to begin with. That is, it is assumed that the variation of d is sufficiently small compared to the focal length f, thereby allowing approximation of the value of d to the value of f and also allowing the application of the affine function in equation (3) to determine the right distance d to be in focus.

It somewhat appears, therefore, that the affine function in equation (3), and/or equation (4), is inapplicable a non-focused situation, where the current value of the distance $d_0$ is significantly different from the optimum focus position—that is, the variation of d is no longer negligible compared to the focal length f. For the determination of the desired value of d to be in focus, an embodiment of the automatic focusing technique should take into account the situations where current value of d (e.g., $d_0$) corresponds to a non-focused position.

In addressing this apparent shortcoming, an embodiment of the automatic focusing technique shows that the value of d obtained using equation (3) can be made closer to or can otherwise approximate the results of the "in-focus" solution. That is, the automatic focusing technique iteratively modifies the position between the lens 64 and the image detector 62 to reach the calculated optimum value of d. With regards to FIG. 4, a first iteration measures a first value of n and makes a first adjustment of d. Then, at the block 416, the process is repeated in a second iteration to determine a new value of n (from a next or subsequent video frame) and to calculate a new value of d, which will be even closer to the optimum value of d (more focused) than the previously calculated value of d. In an embodiment, two to three iterations can be performed until the automatic focusing technique converges or otherwise reaches the optimum focus position.

Thus, for an affine equation (even if the two aiming beams 22 are not perfectly parallel):

$$d = A \cdot n + B, \quad (5)$$

equation (5) converges to the right focus position independently of the starting value of the distance $d_0$ according to the following relation:

$$d_{i+1} = A \cdot n_i + B, \text{ where i is the frame number.}$$

The first image that is obtained with $d_0$ is "blurred" but is sufficiently sharp to localize the image of the two spots 72 and 74.

Embodiments have been described above using two spots 72 and 74 that are respectively obtained from a pair of aiming beams 22 generated by a pair of light sources 63. In another embodiment, automatic focusing can be provided using only one light source 63, which generates only one aiming beam 22 and a corresponding single spot.

In such an embodiment, the value of n relative to the single spot and any fixed point in the image plane can still be determined and used to perform automatic focusing. The fixed point can be the center of the image, for example, or any other point having a location that is spaced from the spot by the determinable distance n. Thus, in various embodiments described above, the first spot 72 corresponds to the aiming beam 22, and the second spot 74 corresponds to another aiming beam 22. In other embodiments, the second spot 74 corresponds to a fixed position in the image plane (whether or not having an aiming beam 22 incident thereon).

Various embodiments provide real-time and motion insensitivity features. For example, real-time autofocusing capability is provided in an embodiment in which only one or two consecutive frames of the video (or image) stream are necessary to find and set the right focus position, thereby allowing real-time autofocusing control.

In contrast with conventional techniques that use "through the lens" (TTL) autofocus algorithms, even with "fast climbing" techniques as used in digital still cameras, require tens of frames. During this focusing phase, the user must be sufficiently quiet and still to get an accurate focus control, thereby making such systems unsuitable for hand held data collection devices.

Furthermore, an embodiment provides total or at least substantial insensitivity to motion. For example and unlike conventional TTL autofocus algorithms, an embodiment of the technique used here to determine the lens position does not rely on the image sharpness and/or contrast. Conventional algorithms are not usable if the user or the target machine-readable symbol is moving. Since the data collection device 10 and the aiming beams 22 of one embodiment belong to the same mechanical part, there is no motion of the aiming spots 72 and 74 relative to the data collection device 10. This means that even in case of very high motion, the image of the target machine-readable symbol can become totally blurred except for the spots 72 and 74 (produced by the aiming beams 22), which are perfectly usable to perform the focus calculation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, while illustrative techniques have been described above in the context of a distance separating two image "dots" in an image plane, the various calculations pertaining to automatic focusing can be performed using other parameters associated with the image on the image plane. Such other parameters can include partial distances between the dots, diagonal measurements, circumferences, radii, area, or other dimensional characteristic associated with the image on the image plane.

Various embodiments have been described above in the context of two concurrent aiming beams 22 provided by the light sources 63 and that result in generation of the two spots 72 and 74 on the image plane. Thus, a single image is obtained that contains both of the two spots 72 and 74. As an example of another possible embodiment, only one of two light sources 63 are activated at a time. Thus, only one aiming beam 22 and corresponding spot is generated at any one time. A first image having the spot 72 (resulting from activation of one of the light sources 63) can be captured. Then a second (subsequent) image having the spot 74 (resulting from activation another one of the light sources 63) can be captured. The two images having their respective spots 72 and 74 can be processed by the processor 34 to determine the distance e between the spots 72 and 74.

Example techniques to change the intensity of illumination, as well as providing automatic focusing capability and/or other capabilities that can be used in some embodiments, are disclosed in U.S. patent application Ser. No. 11/040,485, entitled "AUTOFOCUS BARCODE SCANNER AND THE LIKE EMPLOYING A MICRO-FLUIDIC LENS," filed Jan. 20, 2005, assigned to the same assignee as the present application, and incorporated herein by reference in its entirety.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An automatic data collection system, comprising:
   means for generating at least one aiming beam that can be directed at a target machine-readable symbol;
   image detector means for capturing at least one image of the target machine-readable symbol having the aiming beam directed thereon, the at least one image having a first point corresponding to the aiming beam and having a second point;
   means for determining a first distance between the first and the second points; and
   means responsive to the determined first distance for changing a second distance between the image detector means and an imaging lens to change a focus of the data collection device.

2. The system of claim 1 wherein the means for determining the first distance includes means for determining a pixel distance between the first and the second points.

3. The system of claim 2 wherein the means for changing the second distance comprises a motor means for changing a position of either or both the imaging lens and the image detector means relative to each other.

4. The system of claim 2 wherein the means for determining the first distance includes a processor means for using an affine function to determine the first distance.

5. The system of claim 2 wherein the first and the second points are present on respective separate images.

6. The system of claim 1 wherein said means responsive to the determined first distance for changing said second distance includes means for multiplying the determined first distance by a constant value to obtain an incremental change in the second distance.

7. The system of claim 6 wherein said means for multiplying the determined distance by the constant value includes means for multiplying the determined distance by a pixel size of pixels in the image, a focal length of the lens, divided by a third distance between two of said at least one aiming beam.

8. A method usable with an imager type automatic data collection device, the method comprising:
   directing at least one aiming beam at a target machine-readable symbol;
   at an image detector of the data collection device, capturing at least one image of the target machine-readable symbol having the aiming beam directed thereon, the at least one image having a first point corresponding to the aiming beam and having a second point;
   determining a first distance between the first and the second points by a processor of the imager type automatic data collection device; and
   changing a second distance between the image detector and an imaging lens to change a focus of the data collection device based on the determined first distance.

9. The method of claim 8 wherein directing the aiming beam at the target machine-readable medium comprises directing the aiming beam at a target matrix code symbol.

10. The method of claim 8 wherein directing at least one aiming beam at the target machine-readable symbol includes directing a first and a second aiming beam at the target machine-readable medium, and wherein the first point corresponds to the first aiming beam and the second point corresponds to the second aiming beam.

11. The method of claim 8 wherein determining the first distance between the first and second points includes determining a pixel distance between the first and the second points.

12. The method of claim 8, further comprising:
   multiplying the determined first distance by a constant value to obtain an incremental change in the second distance by the processor of the imager type automatic data collection device.

13. The method of claim 12 wherein multiplying the determined distance by the constant value comprises part of an operation in an affine function.

14. The method of claim 13 wherein multiplying the determined distance by the constant value includes multiplying the determined distance by a pixel size of pixels in the image, a focal length of the lens, divided by a third distance between two of the aiming beams.

15. The method of claim 8, further comprising:
   capturing additional images of the target machine-readable symbol;
   obtaining a new value of the first distance from each of the additional captured images; and
   changing the second distance in response to each new value of the first distance until an optimum focus is obtained.

16. An automatic data collection apparatus, comprising:
   at least one light source to generate a human-perceptible light that produces a human-perceptible indication on a target machine-readable symbol to be imaged;
   a lens;
   a sensor to detect a portion of the human-perceptible light that is returned from the target machine-readable symbol through the lens, the detected light being represented by the sensor in an image plane as a first point that corresponds to the human-perceptible indication on the target machine-readable symbol, the sensor further to provide a second point in the image plane;
   a processor coupled to the sensor to determine a first distance between the first and second points; and
   an adjustment element responsive to the processor to change a second distance between the sensor and the lens based on the determined first distance, a change in the second distance corresponding to an automatic focusing operation.

17. The apparatus of claim 16 wherein the adjustment element comprises a motor coupled to either or both the lens and the sensor to respectively change their position.

18. The apparatus of claim 16 wherein the at least one light source includes a first and a second light source to respectively generate a first and a second human-perceptible light beam.

19. The apparatus of claim 18 wherein the first and the second human-perceptible light beams are substantially parallel to each other.

20. The apparatus of claim 16 wherein the first and the second points are present in a single image derived from the portion of the light detected by the sensor.

21. The apparatus of claim 16 wherein the first and the second points are present in respective different images derived from the portion of the light detected by the sensor.

22. The apparatus of claim 16 wherein the sensor is adapted to capture a plurality of images of the target machine-readable symbol, each of the images having the first and the second points therein, wherein the processor is adapted to determine a new first distance from each of the images and to provide instructions to the adjustment element to incrementally change the second distance based on each new first distance, until an optimum second distance is obtained.

23. An article of manufacture, comprising:
a non-transitory machine-readable medium usable with an automatic data collection device and having instructions stored thereon that are executable by a processor to automatically focus the data collection device, by:
generating at least one aiming beam that can be directed at a target machine-readable symbol;
determining a first distance between a first point and a second point in an image of the target machine-readable symbol having the aiming beam directed thereon, the first point corresponding to a human-perceptible indication on the target machine-readable symbol that is generated by the aiming beam; and
using the determined first distance to change a second distance between an image plane corresponding to the image and an imaging lens.

24. The article of manufacture of claim 23 wherein the instructions for determining the first distance includes using the determined first distance in an affine function to determine an optimum value of the second distance.

25. The article of manufacture of claim 24 wherein the machine-readable medium further includes instructions stored thereon that are executable by the processor to determine new first distances from multiple images, and to correspondingly and incrementally change the second distance based on the determined new first distances, until an optimum second distance is obtained.

26. The article of manufacture of claim 24 wherein the instructions to determine the first distance includes instructions to determine the first distance from the first and the second images, the first point being present in the first image and the second point being present in the second image.

27. The article of manufacture of claim 24 wherein the second point corresponds to another aiming beam.

28. The article of manufacture of claim 24 wherein the second point corresponds to a fixed position in the image plane.

* * * * *